United States Patent
Graham et al.

(10) Patent No.: US 7,224,170 B2
(45) Date of Patent: May 29, 2007

(54) FAULT MONITORING IN A DISTRIBUTED ANTENNA SYSTEM

(75) Inventors: Gerald Graham, Klienburg (CA); Paul Liber, Scarborough (CA)

(73) Assignee: P. G. Electronics, Weston, Ontario (CA)

( * ) Notice: Subject to any disclaimer, the term of this patent is extended or adjusted under 35 U.S.C. 154(b) by 218 days.

(21) Appl. No.: 11/023,910

(22) Filed: Dec. 27, 2004

(65) Prior Publication Data

US 2006/0145884 A1 Jul. 6, 2006

(51) Int. Cl.
*G01R 31/08* (2006.01)
(52) U.S. Cl. .................... 324/522; 324/66; 340/999; 340/687; 340/664; 455/67.11; 455/423
(58) Field of Classification Search ............... 340/687
See application file for complete search history.

(56) References Cited

U.S. PATENT DOCUMENTS

| | | | |
|---|---|---|---|
| 5,257,407 A * | 10/1993 | Heinzelmann | 455/67.11 |
| 5,513,176 A * | 4/1996 | Dean et al. | 370/335 |
| 6,195,561 B1 * | 2/2001 | Rose | 455/523 |
| 6,253,067 B1 * | 6/2001 | Tsuji | 455/115.2 |
| 6,437,577 B1 * | 8/2002 | Fritzmann et al. | 324/523 |
| 6,580,905 B1 * | 6/2003 | Naidu et al. | 455/522 |
| 6,906,681 B2 * | 6/2005 | Hoppenstein | 343/853 |
| 6,928,281 B2 * | 8/2005 | Ward et al. | 455/423 |
| 6,983,174 B2 * | 1/2006 | Hoppenstein et al. | 455/562.1 |

* cited by examiner

*Primary Examiner*—Daniel Wu
*Assistant Examiner*—Eric M. Blount
(74) *Attorney, Agent, or Firm*—Spencer Fane Britt & Browne

(57) ABSTRACT

A method and system for detecting whether an antenna is property connected to a distributed antenna network. The current drawn by the antenna is measured and compared against an expected current draw or reference level. The measured level of current drawn by the antenna is indicative of whether the antenna is properly connected or is disconnected. The comparison results may be used as the basis for creating a status message, which is then communicated to a central monitoring unit for each antenna. The central monitoring unit may generate appropriate alarms in response to a status message indicating a fault condition at a particular antenna.

19 Claims, 3 Drawing Sheets

FAULT MONITORING IN A DISTRIBUTED ANTENNA SYSTEM

FIELD OF THE INVENTION

The present invention relates to distributed antenna systems and, in particular, to monitoring antennas to detect a fault condition.

BACKGROUND OF THE INVENTION

Many facilities present problems for wireless RF communication signals and require that an in-facility signal distribution system be employed to provide adequate wireless reception and coverage within the facility. Signal distribution is often accomplished by providing an antenna distribution system that is coupled to a base station of the wireless communications system. The antenna distribution system typically includes a number of antennas distributed throughout the facility and connected to a base station via coaxial cables. The system may employ a tree-and-branch architecture, wherein uplink and downlink signals to and from the various antennas are combined using couplers.

It was once thought that it was unnecessary to monitor the integrity of a distributed antenna system since it is largely a passive system of cabling, couplers and antennas. However, experience has shown that the regular maintenance that occurs in many large buildings leads to a significant likelihood that one or more of the antennas or cables may be disconnected or severed without it being reported or discovered by the wireless system operator. The result is a loss of service in a section of the facility until a knowledgeable person discovers the problem and reports it to the wireless system operator.

Accordingly a need exists for a method and/or system for detecting fault conditions with regard to antennae in a distributed antenna system.

SUMMARY OF THE INVENTION

The present invention provides a method and system for detecting whether an antenna is property connected to the distributed antenna network. The current drawn by the antenna is measured and compared against an expected current draw or reference level. The measured level of current drawn by the antenna is indicative of whether the antenna is properly connected or is disconnected. The comparison results may be used as the basis for creating a status message for each antenna, which is then communicated to a central monitoring unit. The central monitoring unit may generate appropriate alarms in response to a status message indicating a fault condition at a particular antenna.

In one aspect, the present invention provides a distributed antenna system for providing distributed cellular signal coverage within a facility. The distributed antenna system includes a central monitoring unit and a plurality of antennas coupled to the central monitoring unit through a network. It also includes an antenna monitor unit associated with each antenna, wherein the antenna monitor unit includes an antenna detection component for determining whether the associated antenna is connected to the network. The antenna detection component includes a measurement circuit for measuring a current drawn by the associated antenna and a reporting component for outputting a status message to the central monitoring unit in response to the measurement circuit.

In another aspect the present invention provides an antenna monitor unit for use in a distributed antenna system providing distributed cellular signal coverage within a facility. The distributed antenna system includes a central monitoring unit and a plurality of antennas coupled to the central monitoring unit through a network. The antenna monitor unit has an associated antenna. The antenna monitor unit includes an antenna detection component for determining whether the associated antenna is connected to the network. The antenna detection component includes a measurement circuit for measuring a current drawn by the associated antenna and a reporting component for outputting a status message to the central monitoring unit in response to the measurement circuit.

In yet another aspect, the present invention provides a method of fault monitoring in a distributed antenna system. The distributed antenna system provides cellular coverage within a facility and includes a central monitoring unit and a plurality of antennas coupled to the central monitoring unit through a network. The distributed antenna system includes an antenna monitor unit associated with each antenna. The method includes steps of measuring a current drawn by the associated antenna, determining if the associated antenna is connected to the network based upon the measurement of the current, and sending a status message from the antenna monitor unit to the central monitor unit, wherein the status message reports the determination.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present invention, and in which.

Similar reference numerals are used in different figures to denote similar components.

DESCRIPTION OF SPECIFIC EMBODIMENTS

Figure 1:
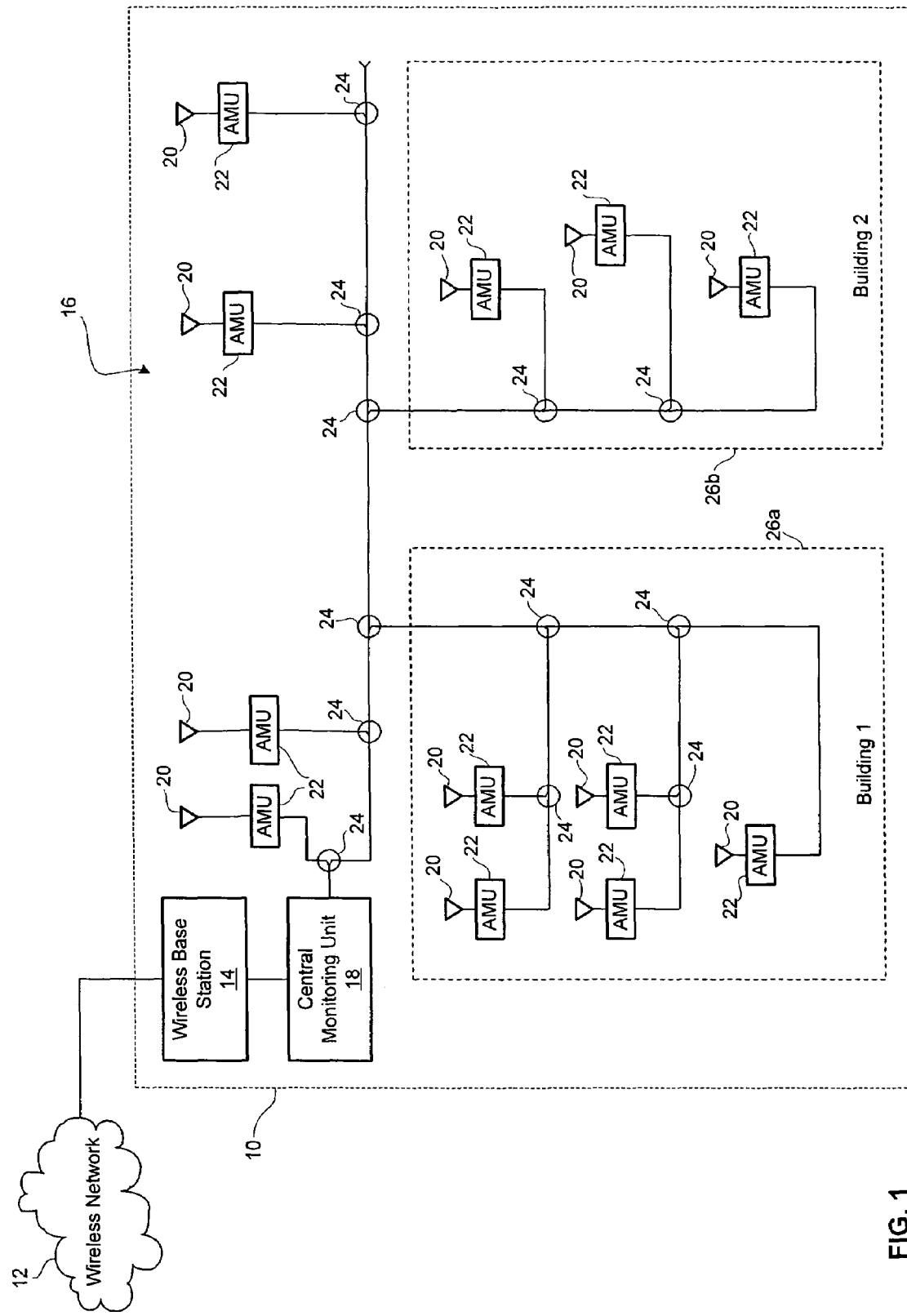
FIG. 1 shows a block diagram of a system for antenna fault monitoring.

Reference is first made to FIG. 1, which shows a block diagram of a system for antenna fault monitoring in accordance with the present invention. A facility 10 has a wireless base station 14, which is coupled to a wireless network 12. The wireless network 12 may be a cellular network, a PCS network, a paging network, or other wireless communication network for interfacing with mobile devices. The wireless network 12 may operate using AMPS, DAMPS, NADC, CDMA, TDMA, GSM, iDEN or other modulation protocols.

The facility 10 may be an indoor facility, an outdoor facility or a mixture of enclosed and open-air spaces. Without limiting the generality of the foregoing, the facility 10 may for example, be a shopping centre, an underground concourse, a subway system, a stadium, a hotel, an office tower, an entertainment center, or a business or industrial complex. In the embodiment shown in FIG. 1, the facility 10 includes an exterior area, a first building 26a and a second building 26b.

A distributed antenna system, generally denoted by the reference numeral 16, is provided within the facility 10. The distributed antenna system 16 is coupled to the wireless base station 14 so as to provide adequate wireless coverage for the wireless network 12 throughout the facility 10. The distributed antenna system 16 includes a plurality of antennas 20 positioned in a variety of locations throughout the facility 10, including within the two buildings 26a, 26b. The antennas 20 are coupled to the wireless base station 14 by coaxial cable, fibre optic cable, twisted pair wiring or any other signal medium, whether wired or wireless. The distributed antenna system 16 may be deployed in a tree-and-branch architecture using coupler units 24 to split signals between branches. It will be understood that the distributed antenna system 16 may be deployed using other architectures. The distributed antenna system 16 may include a number of bidirectional amplifiers (not shown) to compensate for cable losses at various points in the distributed antenna system 16.

The distributed antenna system 16 includes a central monitoring unit 18 for detecting faults and receiving information signals on the distributed antenna system 16 and generating alarms, reports or other outputs. The central monitoring unit 18 may generate alarm signals for display on an in-building monitoring station or computer. The alarm signals may also be transmitted through modem connection, Ethernet connection, or other network connection to an external system.

The distributed antenna system 16 includes an antenna monitor unit 22 associated with each antenna 20. The antenna monitor units 22 may perform a number of functions. For example, the antenna monitor units 22 may include components for monitoring various aspects of the RF communications signal received or transmitted by the antennae 20. In one embodiment, the antenna monitor unit 22 includes an RF level monitoring component for determining the downlink power output in each RF band used by the distributed antenna system 16. The determined power output may be compared with a threshold level and status information regarding the determined power output level may be sent to the central monitoring unit 18. It may include other components for monitoring various aspects of the operation of the antennae 20 or the distributed antenna system 16 in general, and for sending status reports or signals to the central monitoring system 18.

In accordance with an aspect of the present application, the antenna monitor unit 22 includes an antenna detection component. The antenna detection component detects the presence or absence of its associated antenna 20. If the associated antenna 20 were to become disconnected or if the cabling between the antenna 20 and the antenna monitor unit 22 were to become compromised, then the antenna monitor unit 22 detects the fault condition. If such a fault condition is detected by the antenna monitor unit 22, then the antenna monitor unit 22 sends a status signal to the central monitoring unit 18 indicating the fault condition. The status signal includes identification information so that the central monitoring unit 18 knows with which antenna 20 the fault condition is associated.

In one embodiment, the distributed antenna system 16 is a coaxial-based system. The antenna monitor units 22 use low frequency signals to communicate status information to the central monitoring unit 18 and to communicate commands (if any) from the central monitoring unit 18 to the antenna monitor units 22. However, it will be understood that the present invention is not limited to any particular distributed antenna system 16 and may include other systems, including those which carry RF and status signals, in digital or analog format, at other frequencies and over other media between the antennas 20, the antenna monitor units 22, and the central monitoring unit 18.

Figure 2:
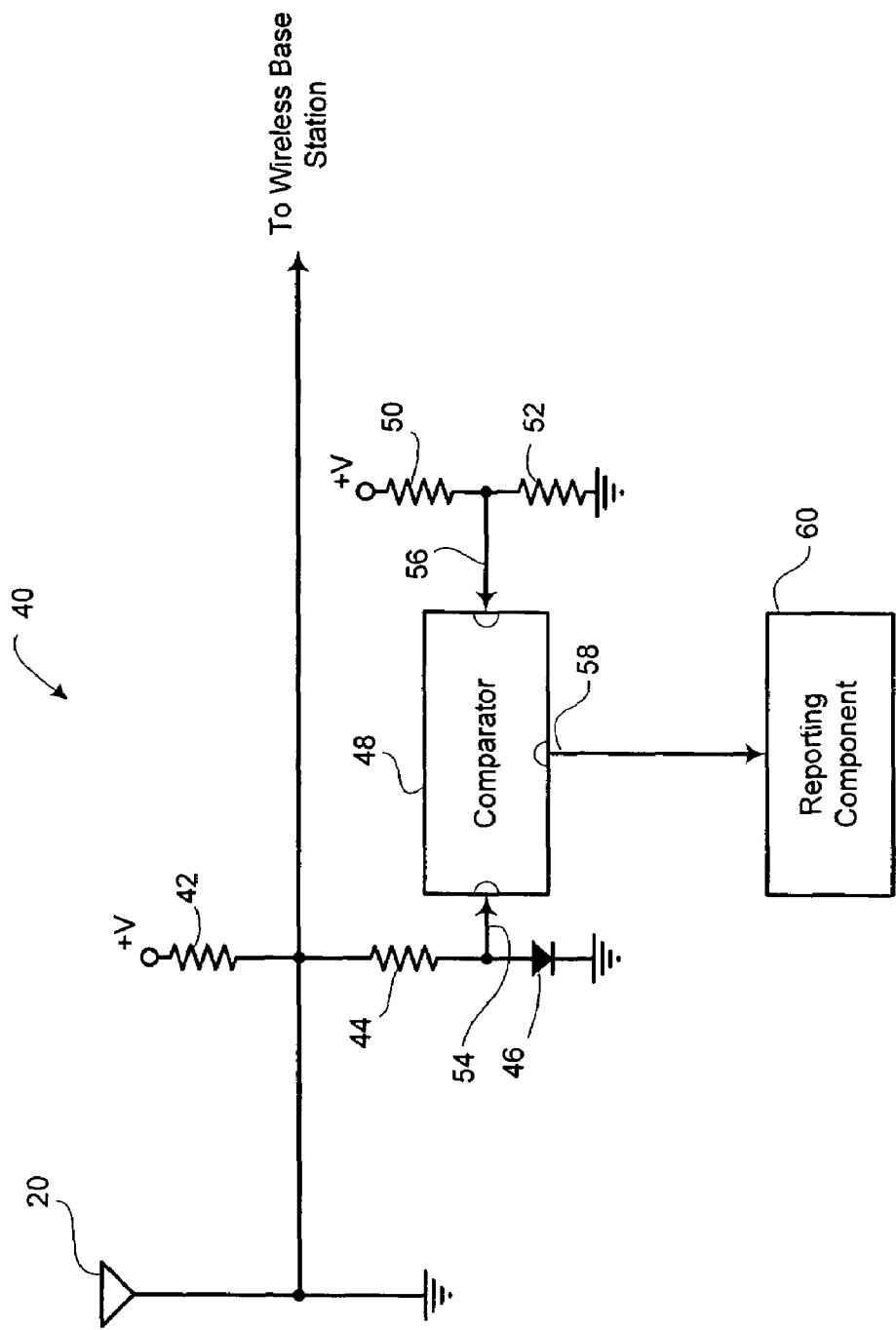
FIG. 2 shows a simplified circuit diagram of an embodiment of an antenna detection component within an antenna monitor unit.

Reference is now made to FIG. 2, which shows a simplified circuit diagram of an embodiment of an antenna detection component 40 within the antenna monitor unit 22. The antenna detection component 40 is coupled to the antenna 20.

The antenna detection component 40 determines whether the antenna 20 is present. It makes this determination on the basis of a current and/or voltage measurement and a comparison of that measurement with an expected reference current and/or voltage.

It will be noted that in this embodiment the antenna 20 includes a grounded terminal. In the coaxial cable based system shown in FIG. 2, the center conductor of the coaxial cable is grounded when an antenna 20 is attached. If the antenna 20 becomes detached, then the center conductor is open-circuited.

The antenna detection component 40 includes a comparator 48, which receives a measured signal 54 and a reference signal 56 as inputs. The comparator 48 outputs a status signal 58 that indicates the result of the comparison. If the measured signal 54 exceeds the reference signal 56, then the status signal 58 indicates a fault condition.

The measured signal 54 is obtained by injecting a small current into the antenna 20 using pull-up resistor 42 having one end connected to positive DC voltage. The other end of the pull-up resistor 42 is coupled to a signal terminal on the antenna 20. In many embodiments, the signal terminal is connected to the center conductor of the coaxial cable. Therefore, the pull-up resistor 42 may be connected to the center conductor. Also coupled to the signal terminal (or center conductor) is a limiting resistor 44, which is then connected to ground through a diode 46. The node between the limiting resistor 44 and the diode 46 provides the measured signal 54. The diode 46 serves to limit the voltage at the node to its turn-on bias voltage of approximately 0.7 volts, thereby protecting the comparator 48.

When the antenna 20 is properly attached, the center conductor (i.e. the signal terminal) is DC grounded, thereby drawing current from the pull-up resistor 42. The measured signal 54 in these circumstances is significantly below the bias voltage necessary to turn-on the diode 46. Typically, the measured signal 54 is close to zero. In some embodiments, it may register slightly above zero volts, depending on various other impedances in the circuitry. In one embodiment, the measured signal 54 is in the range of microvolts when the antenna 20 is properly coupled to the system.

When the antenna 20 is detached, or if the coaxial cable connecting the antenna 20 is severed, the center conductor is open circuited. Accordingly, current is shunted through the limiting resistor 44 and the diode 46, quickly pulling the measured signal 54 up to the bias voltage for the diode 46, i.e. about 0.7 volts.

The reference signal 56 is set by way of a voltage divider formed by resistors 50 and 52. The values of resistors 50 and 52 are selected such that the reference signal 56 is set to a predetermined level. The predetermined level is established below the bias voltage of the diode 46 but above the level of the measurement signal 54 when the antenna 20 is connected. In one embodiment, the reference signal 56 is set to about 10 microvolts. It will be appreciated that other predetermined levels may be used.

Accordingly, when the antenna 20 is connected, the measurement signal 54 is approximately zero and well below the level of the reference signal 56. If the antenna 20 becomes disconnected, then the measurement signal 54 rises above the level of the reference signal 56. The comparator 48 notes the relative change between the signals 54, 56 and it outputs the status signal 58 indicating a fault condition.

It will be appreciated that in some embodiments, the antenna 20 may not include a DC grounded signal terminal. Accordingly, the measurement signal may not be expected to be zero when the antenna 20 is connected. In such an embodiment, appropriate alterations to the circuit configuration to establish an appropriate measurement signal and an appropriate reference level will be apparent to those of ordinary skill in the art having regard to the description herein.

The status signal 58 output by the antenna detection component 40 may be received by a reporting component 60 within the antenna monitoring unit 22 (FIG. 1). The reporting component 60 may generate a status message or code for transmission to the central monitoring unit 18 (FIG. 1) at certain intervals. The status message or code may indicate whether the associated antenna is in an "OK" mode, i.e. attached, or "FAULT" mode, i.e. detached. The status message or code may also include an identifier associated with the antenna monitoring unit 22 and/or associated antenna 20 so that the central monitoring unit 18 knows which antenna is reporting. For example, each antenna 20 or antenna monitoring unit 22 may have a serial number or ID number that is known to the central monitoring unit 18, or they may each have a text descriptor, for example describing the location in which they are deployed.

The reporting component 60 may include one or more timers for determining when to send the status message or code. In some embodiments, if the antenna is in an "OK" mode then the status message or code may be sent less frequently than if the antenna is in a "FAULT" mode in order to reduce the overhead on the system and avoid overwhelming the central monitoring unit 18 with status messages. For example, in one embodiment, the status "OK" message may be sent about every 80 minutes and the status "FAULT" message may be sent about every 80 seconds. It will be appreciated that other message protocols may be used.

It will be appreciated that the antenna monitor unit 22 may include local output signals, such as indicator lights, to signal the mode of the associated antenna. For example, the antenna monitor unit 22 may include red and green LEDs to indicate FAULT and OK modes, respectively.

The central monitoring unit 18 may be configured to deal with incoming "FAULT" messages in a number of ways. One option is to have the central monitoring unit 18 output an alarm signal to alert a wireless system operator to the fault condition. Other possibilities will be apparent to those of ordinary skill in the art.

Figure 3:
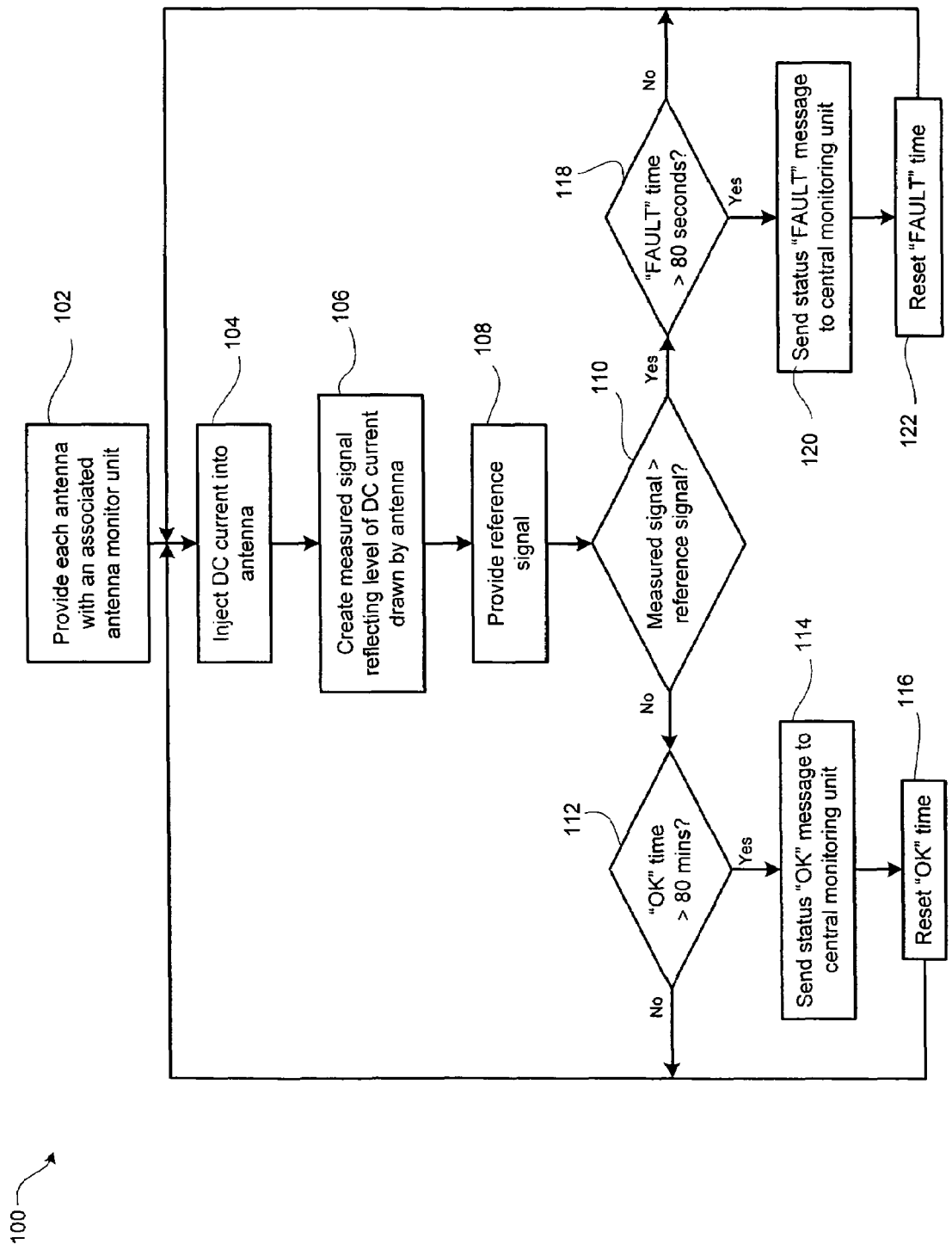
FIG. 3 shows, in flowchart form, a method for detecting a fault condition in a distributed antenna system.

Reference is now made to FIG. 3, which shows, in flowchart form, a method 100 for detecting a fault condition in a distributed antenna system. The method 100 begins in step 102, wherein the system is deployed with an antenna monitor unit 22 (FIG. 1) associated with each antenna 20 (FIG. 1). Each antenna monitor unit 22 has a unique ID code and the central monitoring unit 18 (FIG. 1) has a list of all of the ID codes for the antenna monitor units 22 in the system.

In step 104, the antenna detection component 40 (FIG. 2) injects a DC current into the antenna 20. Then in step 106, the antenna detection circuit 40 creates a measured signal reflecting the level of DC current drawn by the antenna 20, for example by way of the limiting resistor 44 and diode 46 shown in FIG. 2. In step 108, a reference signal is provided.

The measured signal is compared with the reference signal in step 110. If the measured signal exceeds the reference signal, then it is indicative that the antenna 20 is not properly attached and the method 100 proceeds to step 118. If the measured signal does not exceed the reference signal, then it is indicative that the antenna 20 is properly attached and the method 100 proceeds to step 112. Step 110 may be performed, for example, by a comparator, as shown in FIG. 2, and may result in the output of a result signal to a reporting component.

In step 112, the antenna monitoring unit evaluates whether a predetermined time, e.g. 80 minutes, has elapsed since the most recent "OK" status message was transmitted. If not, then the method 100 returns to step 104 to continue monitoring the status of the antenna 20. If so, then the method 100 continues in step 114, wherein the status "OK" message is sent to the central monitoring unit. The status "OK" message includes the unique ID code assigned to the antenna monitoring unit 22. In step 116, the "OK" time is reset before returning to step 104.

In step 118, the antenna monitoring unit evaluates whether a predetermined time, e.g. 80 seconds, has elapsed since the most recent "FAULT" status message was transmitted. If not, then the method 100 returns to step 104 to continue monitoring the status of the antenna 20. If so, then the method 100 continues in step 120, wherein the status "FAULT" message is sent to the central monitoring unit. The status "FAULT" message includes the unique ID code assigned to the antenna monitoring unit 22. In step 122, the "FAULT" time is reset before returning to step 104.

Those of ordinary skill in the art will appreciate that some of the steps of the method 100 described above may be performed concurrently or in a different order without materially affecting the operation of the method 100.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A distributed antenna system for providing distributed cellular signal coverage within a facility, said distributed antenna system comprising:

a central monitoring unit;

a plurality of antennas coupled to said central monitoring unit through a network; and an antenna monitor unit associated with each antenna, said antenna monitor unit including an antenna detection component for determining whether said associated antenna is connected to said network, wherein said associated antenna is a DC grounded antenna, wherein said antenna detection component includes a measurement circuit for measuring a current drawn by said associated antenna and a reporting component for outputting a status message to said central monitoring unit in response to said measurement circuit, and wherein said measurement circuit detects whether said associated antenna is connected to DC ground based upon measurement of said current.

2. The distributed antenna system claimed in claim 1, wherein said antenna detection component includes a current injection circuit for supplying a DC current to said associated antenna.

3. The distributed antenna system claimed in claim 2, wherein said antenna detection component includes a comparator, and wherein said measurement circuit produces a measurement signal reflecting the current drawn by said antenna, said comparator having inputs receiving said measurement signal and a reference signal and outputting a result signal based upon a comparison between said measurement signal and said reference signal, wherein said result signal indicates whether said associated antenna is connected to said network.

4. The distributed antenna system claimed in claim 3, wherein said reporting component receives said result signal, and wherein said status message comprises a fault message output in response to said result signal indicating said associated antenna is disconnected from said network.

5. The distributed antenna system claimed in claim 3, wherein said current injection circuit includes a pull-up resistor connected between said associated antenna and a DC voltage, and wherein said measurement circuit includes a limiting resistor and a diode connected in series between said associated antenna and ground, and wherein said measurement signal is taken from a node between said limiting resistor and said diode.

6. The distributed antenna system claimed in claim 3, wherein said reporting component receives said result signal and wherein said status message comprises an OK message output to said central monitoring unit in response to said result signal indicating said associated antenna is connected to said network.

7. The distributed antenna system claimed in claim 1, wherein said status message includes an identifier associated with said antenna monitor unit.

8. An antenna monitor unit for use in a distributed antenna system providing distributed cellular signal coverage within a facility, said distributed antenna system including a central monitoring unit and a plurality of antennas coupled to said central monitoring unit through a network, said antenna monitor unit having an associated antenna, said antenna monitor unit comprising:
   an antenna detection component for determining whether said associated antenna is connected to said network, including
   a measurement circuit for measuring a current drawn by said associated antenna, wherein said associated antenna is a DC grounded antenna, and wherein said measurement circuit detects whether said associated antenna is connected to DC ground based upon measurement of said current, and
   a reporting component for outputting a status message to said central monitoring unit in response to said measurement circuit.

9. The antenna monitor unit claimed in claim 8, wherein said antenna detection component includes a current injection circuit for supplying a DC current to said associated antenna.

10. The antenna monitor unit claimed in claim 9, wherein said antenna detection component includes a comparator, and wherein said measurement circuit produces a measurement signal reflecting the current drawn by said antenna, said comparator having inputs receiving said measurement signal and a reference signal and outputting a result signal based upon a comparison between said measurement signal and said reference signal, wherein said result signal indicates whether said associated antenna is connected to said network.

11. The antenna monitor unit claimed in claim 10, wherein said reporting component receives said result signal, and wherein said status message comprises a fault message output in response to said result signal indicating said associated antenna is disconnected from said network.

12. The antenna monitor unit claimed in claim 10, wherein said current injection circuit includes a pull-up resistor connected between said associated antenna and a DC voltage, and wherein said measurement circuit includes a limiting resistor and a diode connected in series between said associated antenna and ground, and wherein said measurement signal is taken from a node between said limiting resistor and said diode.

13. The antenna monitor unit claimed in claim 10, wherein said reporting component receives said result signal and wherein said status message comprises an OK message output to said central monitoring unit in response to said result signal indicating said associated antenna is connected to said network.

14. The antenna monitor unit claimed in claim 8, wherein said status message includes an identifier associated with said antenna monitor unit.

15. A method of fault monitoring in a distributed antenna system, said distributed antenna system providing cellular coverage within a facility and including a central monitoring unit and a plurality of antennas coupled to said central monitoring unit through a network, the distributed antenna system including an antenna monitor unit associated with each antenna, wherein said associated antenna is a DC grounded antenna and said network comprises a coaxial cable network said method comprising the steps of:
   measuring a current drawn by said associated antenna including detecting whether said coaxial cable network is open-circuited at said associated antenna;
   determining if said associated antenna is connected to said network based upon said measurement of said current; and
   sending a status message from said antenna monitor unit to said central monitor unit, wherein said status message reports said determination.

16. The method claimed in claim 15, further including a step of supplying a DC current to said associated antenna.

17. The method claimed in claim 15, wherein said step of measuring includes creating a measurement signal reflecting the level of said current drawn, and wherein said step of determining includes comparing said measurement signal with a reference signal and outputting a result signal, wherein said result signal indicates whether said associated antenna is connected to said network.

18. A distributed antenna system for providing distributed cellular signal coverage within a facility, said distributed antenna system comprising:
   a central monitoring unit;
   a plurality of antennas coupled to said central monitoring unit through a network; and
   an antenna monitor unit associated with each antenna, said antenna monitor unit including an antenna detection component for determining whether said associated antenna is connected to said network,
   wherein said antenna detection component includes a measurement circuit for measuring a current drawn by said associated antenna, a reporting component for outputting a status message to said central monitoring unit in response to said measurement circuit, a current injection circuit for supplying a DC current to said associated antenna, and a comparator, and wherein said measurement circuit produces a measurement signal reflecting the current drawn by said antenna, said comparator having inputs receiving said measurement signal and a reference signal and outputting a result signal based upon a comparison between said measurement signal and said reference signal, wherein said result signal indicates whether said associated antenna is connected to said network, and wherein said current injection circuit includes a pull-up resistor connected between said associated antenna and a DC voltage, and wherein said measurement circuit includes a limiting resistor and a diode connected in series between said associated antenna and ground, and wherein said measurement signal is taken from a node between said limiting resistor and said diode.

19. An antenna monitor unit for use in a distributed antenna system providing distributed cellular signal coverage within a facility, said distributed antenna system including a central monitoring unit and a plurality of antennas coupled to said central monitoring unit through a network, said antenna monitor unit having an associated antenna, said antenna monitor unit comprising:

an antenna detection component for determining whether said associated antenna is connected to said network, including a measurement circuit for measuring a current drawn by said associated antenna and a reporting component for outputting a status message to said central monitoring unit in response to said measurement circuit, wherein said antenna detection component includes a current injection circuit for supplying a DC current to said associated antenna and includes a comparator, wherein said measurement circuit produces a measurement signal reflecting the current drawn by said antenna, said comparator having inputs receiving said measurement signal and a reference signal and outputting a result signal based upon a comparison between said measurement signal and said reference signal, wherein said result signal indicates whether said associated antenna is connected to said network, wherein said current injection circuit includes a pull-up resistor connected between said associated antenna and a DC voltage, and wherein said measurement circuit includes a limiting resistor and a diode connected in series between said associated antenna and ground, and wherein said measurement signal is taken from a node between said limiting resistor and said diode.

* * * * *